(12) United States Patent
Takaoka et al.

(10) Patent No.: US 10,756,351 B2
(45) Date of Patent: Aug. 25, 2020

(54) NONAQUEOUS ELECTROLYTE SECONDARY BATTERY

(71) Applicant: KANEKA CORPORATION, Osaka-shi (JP)

(72) Inventors: Ayumi Takaoka, Osaka (JP); Akiko Waki, Osaka (JP)

(73) Assignee: KANEKA CORPORATION, Osaka-shi (JP)

( * ) Notice: Subject to any disclaimer, the term of this patent is extended or adjusted under 35 U.S.C. 154(b) by 196 days.

(21) Appl. No.: 16/060,653

(22) PCT Filed: Oct. 18, 2016

(86) PCT No.: PCT/JP2016/004614
§ 371 (c)(1),
(2) Date: Jun. 8, 2018

(87) PCT Pub. No.: WO2017/098682
PCT Pub. Date: Jun. 15, 2017

(65) Prior Publication Data
US 2018/0366733 A1 Dec. 20, 2018

(30) Foreign Application Priority Data
Dec. 10, 2015 (JP) ................. 2015-241483

(51) Int. Cl.
*H01M 4/62* (2006.01)
*H01M 4/485* (2010.01)
(Continued)

(52) U.S. Cl.
CPC ............ *H01M 4/623* (2013.01); *H01M 2/16* (2013.01); *H01M 2/30* (2013.01); *H01M 4/131* (2013.01);
(Continued)

(58) Field of Classification Search
CPC ........ H01M 4/62; H01M 4/485; H01M 4/505; H01M 4/525; H01M 4/36; H01M 10/0525; H01M 2/16
See application file for complete search history.

(56) References Cited

U.S. PATENT DOCUMENTS 5,415,958 A 5/1995 Takahashi et al.
2002/0086211 A1* 7/2002 Umeno ............ H01M 10/0525
429/231.4
(Continued)

FOREIGN PATENT DOCUMENTS

JP 2001-19896 A 1/2001
JP 2012-219125 A 11/2012
(Continued)

OTHER PUBLICATIONS

Extended European Search Report dated Aug. 30, 2018 in Patent Application No. 16872584.4, 7 pages.
(Continued)

*Primary Examiner* — Kenneth J Douyette
(74) *Attorney, Agent, or Firm* — Oblon, McClelland, Maier & Neustadt, L.L.P.

(57) ABSTRACT

The present invention is intended to provide a nonaqueous electrolyte secondary battery that is suppressed in generation of a gas and a micro short circuit of a negative electrode, while exhibiting an excellent rate characteristic. The present invention relates to a nonaqueous electrolyte secondary battery having a sealed body 70 that encloses a positive electrode 40, a nonaqueous electrolyte solution 60, a negative electrode 30, and a separator 50 formed of an electrically insulating material. The negative electrode 30 is formed by forming a negative electrode active material layer 21, which contains at least a negative electrode active material 12 and a negative electrode binder 11, on a current collector 22. The negative electrode active material 12

(Continued)

contains a titanium compound as a main component, the titanium compound having a particle diameter of 0.1 μm or more and 20.0 μm or less. The negative electrode binder 11 is an acid-modified PVdF obtained by introducing a carboxyl group into a polyvinylidene fluoride (PVdF). A negative electrode water content in the sealed body 70 is 400 ppm or less.

20 Claims, 1 Drawing Sheet

(51) Int. Cl.
*H01M 10/0525* (2010.01)
*H01M 4/505* (2010.01)
*H01M 4/36* (2006.01)
*H01M 4/131* (2010.01)
*H01M 10/0566* (2010.01)
*H01M 2/16* (2006.01)
*H01M 2/30* (2006.01)
*H01M 4/525* (2010.01)
*H01M 4/66* (2006.01)
*H01M 4/52* (2010.01)
*H01M 4/02* (2006.01)

(52) U.S. Cl.
CPC ........... *H01M 4/364* (2013.01); *H01M 4/485* (2013.01); *H01M 4/505* (2013.01); *H01M 4/525* (2013.01); *H01M 4/661* (2013.01); *H01M 10/0525* (2013.01); *H01M 10/0566* (2013.01); *H01M 4/52* (2013.01); *H01M 2004/027* (2013.01); *H01M 2004/028* (2013.01); *H01M 2300/0025* (2013.01)

(56) References Cited

U.S. PATENT DOCUMENTS

| 2007/0292760 | A1* | 12/2007 | Patoux | H01M 4/525 |
| | | | | 429/223 |
| 2008/0280191 | A1* | 11/2008 | Yazami | H01M 4/60 |
| | | | | 429/50 |
| 2011/0073804 | A1* | 3/2011 | Sotokawa | C01G 23/005 |
| | | | | 252/182.1 |
| 2014/0147739 | A1 | 5/2014 | Nakagawa et al. | |
| 2014/0287302 | A1 | 9/2014 | Fukunaga et al. | |
| 2015/0083975 | A1* | 3/2015 | Yeou | H01M 4/623 |
| | | | | 252/506 |
| 2015/0111101 | A1* | 4/2015 | Ikenuma | H01M 4/366 |
| | | | | 429/217 |
| 2016/0099481 | A1 | 4/2016 | Akagawa et al. | |
| 2016/0351891 | A1 | 12/2016 | Sawada et al. | |

FOREIGN PATENT DOCUMENTS

| JP | 5684235 B2 | 3/2015 |
| JP | 5877791 B2 | 3/2016 |
| WO | WO 2011/122261 A1 | 10/2011 |
| WO | WO 2012/049967 A1 | 4/2012 |
| WO | WO 2013/069597 A1 | 5/2013 |
| WO | WO 2013/137272 A1 | 9/2013 |
| WO | WO 2014/189082 A1 | 11/2014 |
| WO | WO 2015/107832 A1 | 7/2015 |

OTHER PUBLICATIONS

International Search Report dated Jan. 24, 2017 in PCT/JP2016/004614 filed Oct. 18, 2016.
Office Action dated Aug. 2, 2019 in European Patent Application No. 16872584.4.
Office Action dated Mar. 4, 2019 in European Patent Application No. 16872584.4.

* cited by examiner

[Fig. 1]
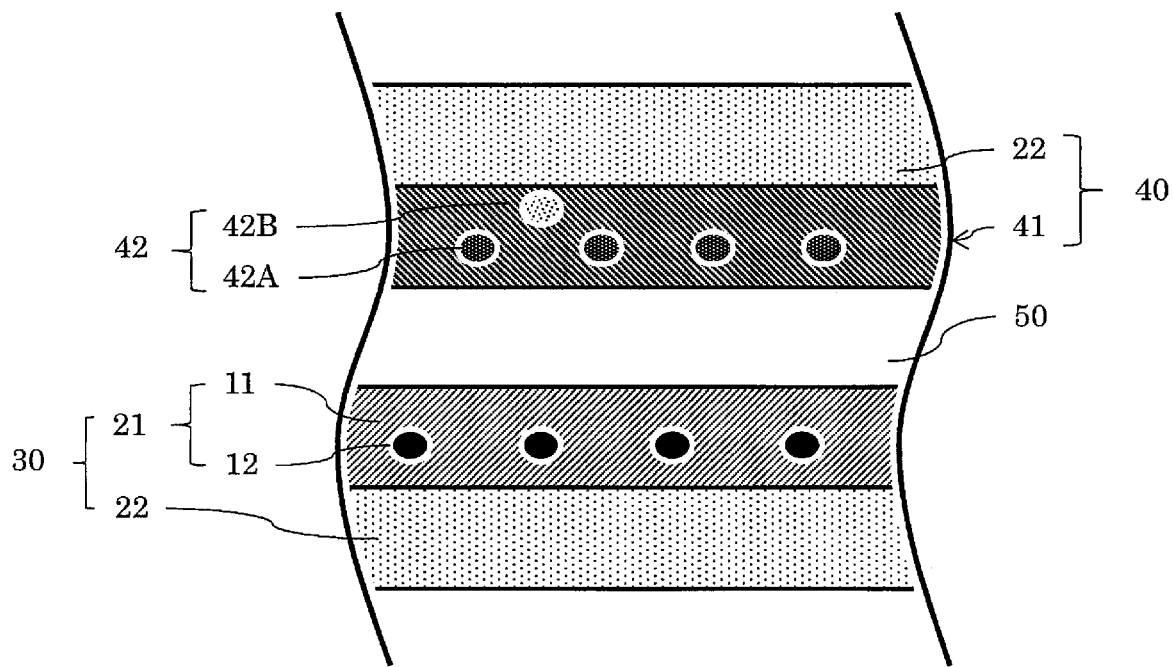
[Fig. 2]
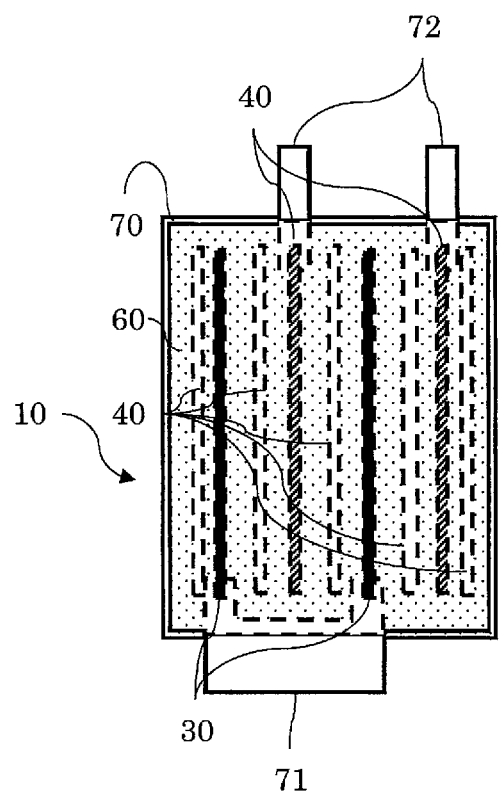

NONAQUEOUS ELECTROLYTE SECONDARY BATTERY

TECHNICAL FIELD

The present invention relates to a nonaqueous electrolyte secondary battery.

TECHNICAL BACKGROUND

A nonaqueous electrolyte secondary battery using a titanium compound for a negative electrode active material is used in a field where a stable battery excellent in safety, long life and rate characteristic is required. On the other hand, increasing an output of a nonaqueous electrolyte secondary battery is also required from the market.

For example, there is a method for increasing a battery output by reducing a particle diameter of a negative electrode active material to widen a specific surface area. However, when the particle diameter of the active material is reduced, a binding property with a base material of an electrode weakens. As a result, there is a problem that the active material falls off and the battery causes a micro short circuit.

As a countermeasure, Patent Document 1 describes a technique for improving a binding force between a negative electrode base material and a negative electrode active material by using a PVdF having a carboxyl group as a negative electrode binder.

RELATED ART

Patent Document

[Patent Document 1] International Publication No. 2012/049967.

SUMMARY OF THE INVENTION

Problems to be Solved by the Invention

However, the technique of Patent Document 1 has a problem that, in a nonaqueous electrolyte secondary battery using a titanium compound, a gas originating from an electrolyte solution is generated. Then, the gas accumulates when charging and discharging are repeated, and causes battery performance to deteriorate.

The present invention is accomplished in order to solve the above problem, and is intended to provide a nonaqueous electrolyte secondary battery that is suppressed in generation of a gas and a micro short circuit of a negative electrode, while exhibiting an excellent rate characteristic.

Means for Solving the Problems

In a nonaqueous electrolyte secondary battery having a sealed body that encloses a positive electrode, a nonaqueous electrolyte solution, a negative electrode, and a separator formed of an electrically insulating material, the negative electrode is formed by coating a negative electrode active material layer, which contains at least a negative electrode active material and a negative electrode binder, on a current collector. The negative electrode active material contains a titanium compound as a main component, the titanium compound having an average particle diameter of 0.1 μm or more and 20.0 μm or less. The negative electrode binder is an acid-modified PVdF obtained by introducing a carboxyl group into a polyvinylidene fluoride (PVdF). A negative electrode water content in the sealed body is 400 ppm or less.

A ratio of a carboxyl group-containing monomer unit in the acid-modified PVdF is preferably 0.05 mol % or more and 1.0 mol % or less of all monomer units in the acid-modified PVdF.

Effect of Invention

According to the nonaqueous electrolyte secondary battery of the present invention, generation of a gas and a micro short circuit of the negative electrode are suppressed while an excellent rate characteristic is exhibited.

BRIEF DESCRIPTION OF DRAWINGS

FIG. 1 is an enlarged view of an electrode portion of a sealed body.

FIG. 2 is a cross-sectional view of a nonaqueous electrolyte secondary battery.

MODE FOR CARRYING OUT THE INVENTION

An embodiment of the present invention is described.

FIG. 1 is an enlarged view of an electrode portion of a sealed body. The electrode portion includes at least a negative electrode 30, a positive electrode 40, and a separator 50. The negative electrode 30 includes a negative electrode active material layer 21 and a current collector 22, the negative electrode active material layer 21 including a negative electrode binder 11 and a negative electrode active material 12. The positive electrode 40 includes a positive electrode active material layer 41 and a current collector 22, the positive electrode active material layer 41 including a positive electrode active material 42.

The negative electrode binder 11 is a material that enhances a binding property between the negative electrode active material layer 21 and the current collector 22. As the negative electrode binder 11, an acid-modified PVdF is used. By using the acid-modified PVdF, a sufficient binding strength can be obtained in binding between the negative electrode active material layer 21 and the current collector 22 even when a large amount of the negative electrode binder 11 is not used.

The acid-modified PVdF refers to a PVdF having at least an acidic group, and the acidic group is a carboxyl group.

A ratio of a carboxyl group-containing monomer unit in the acid-modified PVdF is preferably 0.05 mol % or more and 1.5 mol % or less of all monomer units in the acid-modified PVdF. From a point of view that peeling of the negative electrode active material layer 21 is more suppressed, the ratio of the carboxyl group-containing monomer unit is preferable 0.05 mol % or more ad 1.0 mol % or less. From a point of view that gas generation is more suppressed, the ratio of the carboxyl group-containing monomer unit is more preferably 0.1 mol % or more and 1.0 mol % or less, and even more preferably 0.2 mol % or more and 0.5 mol % or less.

In particular, for a nonaqueous electrolyte secondary battery 10 in which the ratio of the carboxyl group-containing monomer unit in the acid-modified PVdF is 0.05 mol % or more and 1.0 mol % or less, in the negative electrode 30, occurrence of a micro short circuit is suppressed. As a result, even when a state of charge (SOC) of the battery is 50% and the battery is allowed to stand at 25° C. for 14 days, a difference between a battery voltage before the storage test and a battery voltage after the storage test is 0.01 V or less.

The ratio of the carboxyl group-containing monomer unit in the acid-modified PVdF is obtained, for example, from an area ratio of a peak originating from $CH_2$ of a main chain (—$CH_2CF_2$—) of the carboxyl group and the PVdF measured using $^1H$ NMR.

An acid-modified PVdF can be suitably used when an average molecular weight [unit: g/mol] thereof is $6.0 \times 10^5$ or more and $1.0 \times 10^6$ or less. Within the average molecular weight is in this range, the PVdF can be easily handled, and thus, as a result, the negative electrode active material layer 21 is manufactured with high productivity.

From a point of view of a balance between a binding force and an energy density, an amount of the negative electrode binder 11 with respect to 100 parts by mass of an active material is preferably 1 part by mass or more and 30 parts by mass or less, and more preferably 2 parts by mass or more and 15 parts by mass or less. By setting the amount of the negative electrode binder 11 to such a range, conductivity of the negative electrode 30 can be ensured and a sufficient binding property between the negative electrode active material layer 21 and the current collector 22 can be obtained.

The negative electrode active material 12 is used in a lithium ion insertion/desorption reaction in a lithium ion battery.

A titanium compound is a main component of the negative electrode active material 12. In order to be a main component, the titanium compound is required to be contained at 50 mass % or more, preferably at 80 mass % or more with respect to the entire negative electrode active material. Further, apart from the main component, compounds other than the titanium compound may be contained in the negative electrode active material 12.

As the titanium compound, a titanic acid compound, a lithium titanate or a titanium dioxide is preferably used.

As the titanic acid compound, $H_2Ti_3O_7$, $H_2Ti_4O_9$, $H_2Ti_5O_{11}$, $H_2Ti_6O_{13}$ or $H_2Ti_{12}O_{25}$ is preferably used, and, from a point of view that characteristics are stable during long term storage, $H_2Ti_{12}O_{25}$ is more preferable.

A lithium titanate having a spinel type or ramsdellite type structure is preferably used, and, from a point of view that expansion and shrinkage of an active material in a lithium ion insertion/detachment reaction is small, a lithium titanate having a spinel type structure is preferable. From a point of view of safety and stability, a spinel type $Li_4Ti_5O_{12}$ is more preferable.

A titanium dioxide having an anatase type or bronze type ($TiO_2$ (B)) structure is preferably used, and, from a point of view that lithium insertion and desorption efficiently proceed, $TiO_2$ (B) is more preferable.

These titanium compounds may each be independently used, or two or more of these titanium compounds may be used in combination.

Further, these titanium compounds may each be coated with carbon, a metal oxide, or a polymer in order to improve conductivity and stability.

An average particle diameter of a titanium compound is required to be 0.1 μm or more and 20.0 μm or less. A good binding property of the negative electrode active material layer 21 can be obtained by setting the average particle diameter to 0.1 μm or more, and a good rate characteristic can be obtained by setting the average particle diameter to 20.0 μm or less.

The average particle diameter refers to a number average particle diameter of secondary particles formed by agglomeration of primary particles, and refers to a number average particle diameter of primary particles when there are no secondary particles formed by agglomeration of primary particles.

The number average particle diameter is a value obtained by calculating an average of particle diameters based on the number of the particles. When calculating the average value of the number average particle diameter, it is preferable to measure 50 or more particles.

A particle diameter refers to a measured value of a diameter of a particle when the particle is spherical, and refers to a value obtained by measuring a maximum side of a particle for each particle when the particle is not spherical.

A method for measuring a particle diameter is suitably selected according to a size or a property of a measurement target. Specifically, for example, measurement of the particle diameter can be performed using SEM observation, TEM observation, laser microscope observation, or a light scattering method.

A thickness of the negative electrode active material layer 21 is preferably 30 μm or more and 200 μm or less. For a battery, a sufficient electric capacity can be obtained by setting the thickness of the negative electrode active material layer 21 to 30 μm or more, and a sufficient output can be obtained by setting the thickness of the negative electrode active material layer 21 to 200 μm or less.

A density of the negative electrode active material layer 21 is preferably 1.0 g/cm$^3$ or more and 2.5 g/cm$^3$ or less, more preferably 1.5 g/cm$^3$ or more and 2.5 g/cm$^3$ or less, even more preferably 1.6 g/cm$^3$ or more and 2.3 g/cm$^3$ or less, and most preferably 1.8 g/cm$^3$ or more and 2.2 g/cm$^3$ or less.

When the density of the negative electrode active material layer 21 is 1.0 g/cm$^3$ or more, the negative electrode active material 12 and the current collector 22 are in close contact with each other and thus a good electron conductivity is obtained. On the other hand, when the density of the negative electrode active material layer 21 is 2.5 g/cm$^3$ or less, a space where a nonaqueous electrolyte solution penetrates into the negative electrode active material layer 21 is sufficiently secured and thus a good electron conductivity is obtained.

In order to adjust the thickness or the density of the negative electrode active material layer 21 and to strengthen the binding property between the negative electrode active material layer 21 and the current collector 22, the negative electrode active material layer 21 may be rolled. As a rolling method, a roll press or a hydraulic press is suitably used.

The positive electrode active material 42 is used in a lithium ion insertion/desorption reaction in a lithium ion battery.

The positive electrode active material 42 is not particularly limited as long as the positive electrode active material 42 is a lithium transition metal compound. However, a lithium cobalt compound, a lithium nickel compound, a lithium manganese compound, and a lithium iron compounds are preferable. A lithium manganese compound is more preferable. From a point of view of being excellent in stability when charging and discharging of a battery is repeated, a spinel type lithium manganate (42A) is more preferable.

The spinel type lithium manganate (42A) refers to a compound represented by $Li_{1+x}M_yMn_{2-x-y}O_4$ (where $0 \leq x \leq 0.2$, $0 < y \leq 0.6$, and M is an element belonging to groups 2 to 13 and belonging to the third period or the fourth period).

From a point of view that manganese elution or the like is unlikely to occur and that an effect of improving stability during long-term storage is large, the M of $Li_{1+x}M_yMn_{2-x-y}O_4$ is preferably aluminum (Al), magnesium (Mg), zinc (Zn), cobalt (Co), iron (Fe) or chromium (Cr), more preferably Al, Mg, Zn or Cr, and even more preferably Al, Mg, or Zn.

The positive electrode active material 42 may contain a layered rock salt type compound (42B). The layered rock salt type compound (42B) absorbs a gas generated in the battery and thereby, the life of the nonaqueous electrolyte secondary battery is extended.

The layered rock salt type compound (42B) is not particularly limited as long as the layered rock salt type compound (42B) is a compound having a layered rock salt type structure. For example, compounds represented by $LiMO_2$ (where M represents a transition metal) such as lithium nickelate ($LiNiO_2$), lithium cobaltate ($LiCoO_2$), lithium nickel cobaltate ($LiNi_{1-y}Co_yO_2$), nickel cobalt lithium manganate ($LiNi_xCo_yMn_{1-y-z}O_2$, where x+y+z=1) or lithium nickel cobalt aluminate ($LiNi_{0.8}CO_{0.15}Al_{0.05}O_2$), or lithium manganate ($LiMnO_3$) containing excess lithium, or a solid solution of $LiMO_2$ and $Li_2MnO_3$ and the like are preferable, and $LiCoO_2$ is more preferable.

These layered rock salt type compounds (42B) may each be independently used, or two or more of these layered rock salt type compounds (42B) may be used in combination.

An amount of the layered rock salt type compound (42B) with respect to a total amount of the positive electrode active material 42 is preferably 2 mass % or more and 10 mass % or less, and more preferably 2 mass % or more and 5 mass % or less. By setting the amount of the layered rock salt type compound (42B) to such a range, a gas generated in the battery is absorbed by the layered rock salt type compound and the nonaqueous electrolyte secondary battery 10 having excellent cycle characteristics (to de described later) can be obtained.

The current collector 22 is not particularly limited as long as the current collector 22 is a conductor. However, metals such as aluminum (Al), copper (Cu), nickel (Ni) or titanium (Ti), or alloys of these metals, stainless steel, or these metals or alloys coated with a metal or alloy that does not react at a positive electrode potential and a negative electrode potential are preferable. From a point of view of being easily availability at a low cost, Al is more preferable.

As a method for manufacturing the negative electrode 30 or the positive electrode 40, for example, a method is suitably used in which a slurry containing an active material, a binder and a solvent is coated on the current collector 22 and, in this state, the solvent is removed by drying.

As a method for coating the slurry on both sides or one side of the current collector 22, a method of coating the slurry using a doctor blade, a die coater or a comma coater, a method of adhering the slurry to the current collector by spraying, or a method of impregnating the current collector with the slurry is suitably used.

The solvent of the slurry is not particularly limited. However, from a point of view that water is removed beforehand from the materials of the negative electrode 30 and the positive electrode 40, a nonaqueous solvent is preferable.

Examples of the nonaqueous solvent include N-methyl-2-pyrrolidone (NMP), dimethylformamide (DMF), dimethylacetamide, methyl ethyl ketone, methyl acetate, ethyl acetate, tetrahydrofuran (THF), and the like. These nonaqueous solvents may each be independently used, or two or more of these nonaqueous solvents may be used in combination.

The negative electrode active material layer 21 and the positive electrode active material layer 41 may each contain a conductive additive.

The conductive additive is not particularly limited as long as the conductive additive is conductive, but is preferably metal or carbon. The metal is more preferably Cu and/or Ni. The carbon is more preferably one or more selected from a group consisting of natural graphite, artificial graphite, vapor grown carbon fiber, carbon nanotubes, acetylene black, ketjen black, and furnace black.

An amount of the conductive additive of the positive electrode 40 with respect to 100 parts by mass of the positive electrode active material 42 is preferably 1 part by mass or more and 30 parts by mass or less, and more preferably 2 parts by mass or more and 10 parts by mass or less. By setting the amount of the conductive additive of the positive electrode 40 to such a range, the conductivity of the positive electrode 40 is ensured.

An amount of the conductive additive of the negative electrode 30 with respect to 100 parts by mass of the negative electrode active material 12 is preferably 0.5 parts by mass or more and 30 parts by mass or less, and, from a point of view of a good balance between a battery output and an energy density, is more preferably 1 part by mass or more and 10 parts by mass or less. By setting the amount of the conductive additive of the negative electrode 30 to such a range, the conductivity of the negative electrode 30 is ensured and sufficient adhesion between the negative electrode active material layer 21 and the current collector 22 is obtained.

The separator 50 functions as a medium that prevents conduction of electrons and holes between the positive electrode 40 and the negative electrode 30 and mediates conduction of lithium ions between the electrodes.

An electrically insulating material can be suitably used as a material of the separator 50 as long as the electrically insulating material has a resistivity of at least $10^3 \Omega$ or more.

Specifically, for example, a woven fabric, a nonwoven fabric or a microporous membrane containing at least one selected from a group consisting of nylon, cellulose, polysulfone, polyethylene (PE), polypropylene (PP), polyacrylonitrile, polyimide, polyamide and polyethylene terephthalate can be used.

From a point of view of practicality, a nonwoven fabric containing at least one of cellulose, PE, PP and PET is preferable.

FIG. 2 is a cross-sectional view of a nonaqueous electrolyte secondary battery. The nonaqueous electrolyte secondary battery 10 includes a sealed body 70, a negative electrode terminal 71, and a positive electrode terminal 72.

The sealed body 70 encloses an electrode group in which the negative electrode 30, the positive electrode 40 and the separator 50 are wound or laminated, and a nonaqueous electrolyte solution 60.

At least one terminal is connected to an end portion of each of the positive electrode 40 and the negative electrode 30. A portion of at least one of the negative electrode terminal 71 and the positive electrode terminal 72 extends to outside of the sealed body 70. The negative electrode terminal 71 and the positive electrode terminal 72 are electrically connected to an external device.

There may be a case where water is contained in the nonaqueous electrolyte secondary battery 10. Causes for this include that water is mixed during a manufacturing process of the battery, that a material of the battery contains water, that water in the battery cannot be sufficiently removed and remains, and the like.

In particular, water in the negative electrode affects battery characteristics and long-term use of the battery or a gas generation amount in aging. One of causes for gas generation is presumed to be decomposition of the electrolyte solution due to an interaction between the carboxyl group of the acid-modified PVdF and a decomposition product of water at an active site of the titanium compound.

Therefore, the nonaqueous electrolyte secondary battery 10 needs to control a water content of the negative electrode. Examples of a method for controlling the water content of the negative electrode include drying in a low moisture atmosphere, drying under a reduced pressure, heat drying, and heat drying under a reduced pressure. From a point of view that the water content can be easily controlled, drying under a reduced pressure or heat drying under a reduced pressure is preferable.

The control of the water content of the negative electrode may be performed before or after the negative electrode 30 is assembled.

The water content of the negative electrode is required to be 400 ppm or less. From a point of view of suppressing gas generation, the water content of the negative electrode is preferably 300 ppm or less.

After the nonaqueous electrolyte secondary battery 10 is assembled, for a purpose of decomposing and removing water in the battery, a curing process (aging) may be included.

As a method of aging, repeated charging and discharging of the nonaqueous electrolyte secondary battery 10, or preservation of the nonaqueous electrolyte secondary battery 10 in a specific state of charge (SOC) is preferably used.

The water content of the negative electrode can be measured using the following method. First, a sample of the negative electrode 30 is taken from the nonaqueous electrolyte secondary battery 10 immediately before the electrolyte solution is injected. Thereafter, a water content per unit weight of the negative electrode is measured at a heating temperature of 190° C. or higher using a Karl Fischer method.

The negative electrode 30 has a function of receiving lithium ions and a function of receiving electrons via the current collector 22 and the negative electrode terminal 71 during charging of the nonaqueous electrolyte secondary battery 10. The negative electrode 30 also has a function of releasing lithium ions and a function of supplying electrons via the negative electrode terminal 71 during discharging of the nonaqueous electrolyte secondary battery 10.

The positive electrode 40 has a function of receiving lithium ions and a function of receiving electrons via the current collector 22 and the positive electrode terminal 72 during discharging of the nonaqueous electrolyte secondary battery 10. The positive electrode 40 also has a function of releasing lithium ions and a function of supplying electrons via the positive electrode terminal 72 during charging of the nonaqueous electrolyte secondary battery 10.

From a point of view that uniformity of an electrode reaction can be improved and that the battery can be made compact, a ratio ($Q_{max}/Q_{min}$) of a maximum electric capacity ($Q_{max}$) and a minimum electric capacity ($Q_{min}$) of an electric capacity (Q) per an electrode area is preferably 1.0 or more and 1.3 or less.

The $Q_{min}$ and the $Q_{max}$ may be substantially equal. In this case, with respect to an electric capacity ratio ($Q_n$) of an electric capacity per unit area of the negative electrode to an electric capacity ($Q_p$) per unit area of the positive electrode, a value of ($Q_n/Q_p$) is preferably 0.8 or more and 1.3 or less.

When the value of ($Q_n/Q_p$) is 0.8 or more, occurrence of a short circuit in a case of overcharging is suppressed. On the other hand, when the value of ($Q_n/Q_p$) is 1.3 or less, a side reaction is unlikely to occur in the negative electrode active material 12 and thus, gas generation is suppressed.

When the value of ($Q_n/Q_p$) exceeds 1.0, a voltage change accompanying charging and discharging is regulated by a positive electrode potential change. That is, it becomes a positive electrode regulation, and a positive electrode abnormal active point that becomes a cause of generation of a gas originating from the positive electrode in long-term use is unlikely to occur.

As a result, an amount of the positive electrode active material 42 to be used is kept to a minimum necessary.

When the value of ($Q_n/Q_p$) is less than 1.0, a voltage change accompanying charging and discharging is regulated by a negative electrode potential change. That is, it becomes a negative electrode regulation, and a negative electrode abnormal active point that becomes a cause of generation of a gas originating from the negative electrode in long-term use is unlikely to occur. As a result, an amount of the negative electrode active material 12 to be used is kept to a minimum necessary.

The nonaqueous electrolyte solution 60 contains an electrolyte and a nonaqueous solvent and mediates lithium ions in an electrode reaction of the lithium ion battery.

From a point of view that conduction of lithium ions is sufficiently ensured, an amount of the nonaqueous electrolyte solution 60 per 1 Ah of a battery capacity is preferably 0.1 mL or more.

The electrolyte is not particularly limited as long as the electrolyte is a lithium salt soluble in a nonaqueous solvent. However, $LiClO_4$, $LiBF_4$, $LiPF_6$, $LiAsF_6$, $LiCF_3SO_3$, LiBOB (Lithium Bis (Oxalato) Borate), $LiN(SO_2CF_3)_2$ are preferable, and, from a point of view of being easily dissoluble in a nonaqueous solvent, $LiPF_6$ is more preferable.

From a point of view that solvent decomposition is less likely to occur at an operating potential of the battery, the nonaqueous solvent is preferably an aprotic solvent, more preferably an aprotic polar solvent, and even more preferably a cyclic aprotic polar solvent or a chain aprotic polar solvent.

Examples of the cyclic aprotic polar solvent include cyclic ester, cyclic sulfone, cyclic ether, cyclic carbonate, and the like.

Examples of the chain aprotic polar solvent include acetonitrile, chain carbonate, carboxylate ester, chain ether, and the like.

Specific examples of the cyclic aprotic polar solvent and the chain aprotic polar solvent include ethylene carbonate, propylene carbonate, fluoroethylene carbonate, dimethyl carbonate, methyl ethyl carbonate, diethyl carbonate, dipropyl carbonate, methyl propyl carbonate, butylene carbonate, γ-butyl lactone, 1,2-dimethoxyethane, sulfolane, dioxolane, methyl propionate, and the like.

These nonaqueous solvents may each be independently used, or two or more of these nonaqueous solvents may be used in combination. From a point of view of improving solubility of the electrolyte, which is a supporting salt, and from a point of view of improving lithium ion conductivity, it is preferable to use 2 or more of these nonaqueous solvents in combination.

From a point of view that the lithium ion conductivity is good, and from a point of view that the solubility of the electrolyte is good, a concentration of the nonaqueous electrolyte solution 60 is preferably 0.5 mol/L or more and 2.0 mol/L or less.

EXAMPLES

In the following, the present invention is described in more detail based on examples. However, the present invention is not limited by these examples.

Example 1

First, a powder of spinel-type lithium manganate ($Li_{1.1}Al_{0.1}Mn_{1.8}O_4$) was obtained using a method described in literature (Electrochemical and Solid-State Letters, 9 (12), A557 (2006)).

Next, cobalt hydroxide and lithium hydroxide monohydrate were weighed and thoroughly mixed such that an atomic ratio of cobalt atoms to lithium atoms was 1:1.03. Thereafter, the mixture was calcined and pulverized at a temperature of 850° C. for a predetermined time period in an air atmosphere. Then, lithium cobaltate was obtained.

Next, spinel-type lithium manganate and lithium cobaltate were mixed at a mass ratio of 95:5 to obtain a positive electrode active material. Thereafter, a solution having a solid content concentration of 8 mass % in which 5 parts by mass of a PVdF as a positive electrode binder was dissolved in NMP, 100 parts by mass of the positive electrode active material, and 5 parts by mass of acetylene black as a conductive additive were mixed to obtain a positive electrode slurry.

Then, the positive electrode slurry was applied to an aluminum foil having a thickness of 15 μm to obtain a positive electrode sheet. Thereafter, the positive electrode sheet was vacuum dried at 170° C. Then, the positive electrode sheet was punched into a size of 4 cm×6 cm. Through the above processes, a positive electrode was obtained.

Next, a $Li_4Ti_5O_{12}$ powder was prepared using a method described in literature (Journal of Electrochemical Society, 142, 1431 (1995)). Then, a lithium titanate powder (LTO) having an average particle diameter of 7.0 μm was obtained.

Next, a solution having a solid content concentration of 5 mass % in which 5 parts by mass of an acid-modified PVdF having a carboxyl group content of 0.3 mol % as a negative electrode binder was dissolved in NMP, 100 parts by mass of the LTO powder, and 5 parts by mass of acetylene black as a conductive additive were mixed to obtain a negative electrode slurry.

Then, the negative electrode slurry was applied to an aluminum foil having a thickness of 15 μm to obtain a negative electrode sheet. Thereafter, the negative electrode sheet was vacuum dried at 170° C. Then, the negative electrode sheet was punched into a size of 4.3 cm×6.3 cm. Through the above processes, a negative electrode was obtained.

Next, 13 sheets of positive electrodes and 14 sheets of negative electrodes were laminated via a cellulose nonwoven fabric having a thickness of 25 μm and an area of 30 cm². Thereafter, the positive electrodes were collectively connected to one positive electrode terminal, and the negative electrodes were collectively connected to one negative electrode terminal. Then, the terminal and the electrodes were vibration welded. Through the above processes, an electrode group having the negative electrode terminal and the positive electrode terminal was obtained.

Next, the electrode group was placed in a bag of an aluminum laminate sheet with the terminals partially extending to an outer side. Thereafter, a nonaqueous electrolyte solution having a concentration of 1 mol/L, which was obtained by adding $LiPF_6$ as a solute to a solvent in which ethylene carbonate and dimethyl carbonate were mixed at a volume ratio of 3:7, was added to the bag. Then, water content in the bag was removed by vacuum drying until a negative electrode water content reached 400 ppm or less.

Then, a sealed body, which is obtained by sealing an opening part of the bag while reducing a pressure inside the bag, was allowed to stand at a room temperature for 12 hours. Through the above processes, a nonaqueous electrolyte secondary battery was obtained.

Electric capacities per unit area of the positive electrodes were all within a range of 1.6 mAh/cm² or more and 1.7 mAh/cm² or less. Electric capacities per unit area of the negative electrodes were all 1.8 mAh/cm².

Example 2

Example 2 was the same as Example 1 except that the average particle diameter of LTO was 0.4 μm.

Example 3

Example 3 was the same as Example 1 except that the average particle diameter of LTO was 19.0 μm.

Example 4

Example 4 was the same as Example 1 except that the carboxyl group content of the acid-modified PVdF was 0.05 mol %.

Example 5

Example 5 was the same as Example 1 except that the carboxyl group content of the acid-modified PVdF was 0.9 mol %.

Example 6

Example 6 was the same as Example 1 except that the carboxyl group content of the acid-modified PVdF was 1.5 mol %.

Example 7

First, a $TiO_2$ (B) powder having an average particle diameter of 4.0 μm was obtained using a method described in literature (Journal of Electrochemical Society, 159, A49-A54 (2012)). Then, Example 7 was the same as Example 1 except that the negative electrode active material was the $TiO_2$ (B) powder.

Example 8

First, a $H_2Ti_{12}O_{25}$ powder having an average particle diameter of 5.0 μm was obtained using a method described in literature (Journal of Electrochemical Society, 158, A546-

A549 (2011)). Then, Example 8 was the same as Example 1 except that the negative electrode active material was the $H_2Ti_{12}O_{25}$ powder.

Example 9

Example 9 was the same as Example 1 except that the positive electrode active material was obtained by mixing spinel type lithium manganate and lithium cobaltate at a mass ratio of 98:2.

Comparative Example 1

Comparative Example 1 was the same as Example 1 except that 5 parts by mass of PVdF that does not contain a carboxyl group was used as a negative electrode binder.

Comparative Example 2

Comparative Example 2 was the same as Example 1 except that the average particle diameter of LTO was 0.05 μm.

Comparative Example 3

Comparative Example 3 was the same as Example 1 except that the average particle diameter of LTO was 25.0 μm.

Comparative Example 4

Comparative Example 4 was the same as Example 1 except that water in the bag was removed by vacuum drying such that the water content of the negative electrode was 450 ppm.

<Characteristics Measurements>

The following characteristics measurements were performed with respect to the nonaqueous electrolyte secondary batteries of the above Examples 1-9 and Comparative Examples 1-4. Results of the measurements are shown in Table 1.

(Storage Test) First, 100 nonaqueous electrolyte secondary batteries each having a state of charge (SOC) of 50% were prepared, and terminals extended to outside were each protected with an insulator, and the batteries were allowed to stand at 25° C. for 14 days. In this case, battery voltages before the storage test and battery voltages after the storage test were measured.

A difference between a battery voltage before the storage test and a battery voltage after the storage test was taken as a battery voltage change, and when the battery voltage change was 0.01 V or more, the battery was judged to be defective due to occurrence of a micro short circuit. A defect occurrence rate when the 100 batteries were evaluated was taken as a micro short circuit occurrence rate.

(Charging Rate Test) Charging rate tests were performed before and after the storage test. First, with respect to the nonaqueous electrolyte secondary batteries, charging was performed under a charging condition 1, and then, charging or discharging was performed under a discharging condition 1, a charging condition 2, and a discharging condition 2 in this order. A battery environmental temperature for the charging and discharging was set to 25° C.

Voltages in the charging conditions 1 and 2, and the discharging conditions 1 and 2 are voltages of the nonaqueous electrolyte secondary batteries. Regarding C, a value of a current required to charge or discharge a total capacity of a nonaqueous electrolyte secondary battery in 1 hour is defined as 1 C. For example, 0.02 C refers to a current of 0.02 times that current value.

Charging condition 1: Charging is performed with a constant current of 0.2 C until a voltage of 2.7 V is reached. Thereafter, charging is performed at a constant voltage by maintaining the voltage at 2.7 V. Thereafter, when the current reaches 0.02 C, charging is terminated.

Discharging condition 1: Discharging is performed at a constant current of 0.2 C until the voltage is reduced to 2.0 V. When the voltage is reduced to 2.0 V, discharging is terminated.

Charging condition 2: Charging is performed with a constant current of 1 C until a voltage of 2.7 V is reached. Thereafter, charging is performed at a constant voltage by maintaining the voltage at 2.7 V. Thereafter, when the current reaches 0.02 C, charging is terminated.

Discharging condition 2: Discharging is performed at a constant current of 2.0 C until the voltage is reduced to 2.0 V. When the voltage is reduced to 2.0 V, discharging is terminated.

A rate characteristic was calculated from a value obtained by dividing a discharge capacity of the discharging condition 2 by a discharge capacity of the discharging condition 1. A percentage of a rate characteristic before the storage test to a rate characteristic after the storage test is taken as a rate characteristic retention rate.

(Charging-Discharging Cycle Test) A charging-discharging cycle test was performed after the storage test. First, a nonaqueous electrolyte secondary battery was charged under a charging condition 3. Next, charging and discharging were repeated 400 cycles with one cycle unit including charging once and discharging once under a discharging condition 3 and the charging condition 3. Then, the battery was discharged under the discharging condition 3. A battery environmental temperature for the charging and the discharging was set to 60° C.

Charging condition 3: Charging is performed with a constant current of 0.5 C until a voltage of 2.7 V is reached. Thereafter, charging is performed at a constant voltage by maintaining the voltage at 2.7 V. Thereafter, when the current reaches 0.02 C, charging is terminated.

Discharging condition 3: Discharging is performed at a constant current of 1.0 C until the voltage is reduced to 2.0 V. When the voltage is reduced to 2.0 V, discharging is terminated.

A percentage value of a discharge capacity of the first cycle of the charging-discharging cycle test to a discharge capacity of the battery after the completion of the charging-discharging cycle test was taken as a capacity retention rate.

(Gas Generation Amount Measurement Test) First, a battery before the storage test was prepared. A gas pocket as a part of a volume of a sealed body was provided on an aluminum laminate sheet of the battery. Next, the storage test of the battery was performed, and a generated gas was accumulated in the gas pocket. Then, a volume change of the battery before and after the storage test was measured using an Archimedes method, and an increase in the volume was taken as a gas generation amount.

(Battery Evaluation Criteria) A case where a nonaqueous electrolyte secondary battery has a micro short circuit occurrence rate of 2% or less, a rate characteristic retention rate of 94% or more, and a gas generation amount per unit capacity of 0.3 mL/Ah or less was regarded as acceptable. Within the acceptable ranges, a case where a capacity retention rate (cycle characteristic) in the charging-discharging cycle test is 91% or more was evaluated as having particularly excellent performance (x: unacceptable; ◯: acceptable, ⊚: having particularly excellent performance, and acceptable).

TABLE 1

| Item | Composition | | | | | | Characteristics evaluation | | | | Result |
|---|---|---|---|---|---|---|---|---|---|---|---|
| | Negative electrode active material | | Carboxyl group content of negative electrode PVdF (mol %) | Water content (ppm) | Positive electrode active material | | Micro short circuit occurrence rate (%) | Rate characteristic retention rate (%) | Gas generation amount (mL/Ah) | Cycle characteristic | |
| | Titanium compound | Particle diameter (μm) | | | Lithium manganate | Lithium cobaltate | | | | | |
| Example 1 | LTO | 7.0 | 0.3 | 400 | 95 | 5 | 0 | 97 | 0 | 95 | ⊚ |
| Example 2 | LTO | 0.4 | 0.3 | 400 | 95 | 5 | 0 | 98 | 0 | 92 | ⊚ |
| Example 3 | LTO | 19.0 | 0.3 | 400 | 95 | 5 | 0 | 95 | 0 | 95 | ⊚ |
| Example 4 | LTO | 7.0 | 0.05 | 330 | 95 | 5 | 2 | 96 | 0 | 90 | ○ |
| Example 5 | LTO | 7.0 | 0.9 | 240 | 95 | 5 | 0 | 98 | 0 | 93 | ⊚ |
| Example 6 | LTO | 7.0 | 1.5 | 290 | 95 | 5 | 0 | 94 | 0.3 | 88 | ○ |
| Example 7 | $TiO_2$ (B) | 4.0 | 0.3 | 250 | 95 | 5 | 0 | 98 | 0 | 93 | ⊚ |
| Example 8 | $H_2Ti_{12}O_{25}$ | 5.0 | 0.3 | 250 | 95 | 5 | 0 | 98 | 0 | 95 | ⊚ |
| Example 9 | LTO | 7.0 | 0.3 | 400 | 98 | 2 | 0 | 97 | 0 | 94 | ⊚ |
| Comparative Example 1 | LTO | 7.0 | 0 | 400 | 95 | 5 | 3 | 95 | 0 | 93 | X |
| Comparative Example 2 | LTO | 0.05 | 0.3 | 400 | 95 | 5 | 4 | 99 | 0.2 | 87 | X |
| Comparative Example 3 | LTO | 25.0 | 0.3 | 400 | 95 | 5 | 0 | 88 | 0 | 96 | X |
| Comparative Example 4 | LTO | 7.0 | 0.3 | 450 | 95 | 5 | 0 | 91 | 1 | 89 | X |

[Overall Evaluation of Table 1] The batteries of Comparative Examples 1-4 did not meet the evaluation criteria. On the other hand, the batteries of Examples 1-9 exhibited performance passing the evaluation criteria. For the batteries of Examples 1, 2, 3, 5, 7, 8 and 9, the carboxyl group content of the negative electrode PVdF was 0.1 mol % or more and 1.0 mol % or less. Therefore, the batteries of Examples 1, 2, 3, 5, 7, 8 and 9 passed the evaluation criteria and were particularly excellent in performance.

DESCRIPTION OF REFERENCE NUMERALS

10: nonaqueous electrolyte secondary battery
11: negative electrode binder
12: negative electrode active material
21: negative electrode active material layer
22: current collector
30: negative electrode
40: positive electrode
41: positive electrode active material layer
42: positive electrode active material
42A: spinel type lithium manganate
42B: layered rock salt type compound
50: separator
60: nonaqueous electrolyte solution
70: sealed body
71: negative electrode terminal
72: positive electrode terminal

What is claimed is:

1. A nonaqueous electrolyte secondary battery, comprising:
a sealed body enclosing a positive electrode, a nonaqueous electrolyte solution, a negative electrode, and a separator which comprises an electrically insulating material and is sandwiched between the positive electrode and the negative electrode, wherein the negative electrode comprises a current collector and a negative electrode active material layer coated on the current collector and comprising a negative electrode active material and a binder, the negative electrode active material comprises a titanium compound having an average particle diameter of from 0.1 to 20.0 μm, the binder comprises an acid-modified PVdF having a carboxyl group introduced into a polyvinylidene fluoride (PVdF), the acid-modified PVdF comprises a monomer unit that comprise the carboxyl group at a ratio of from 0.1 mol % to 1.0 mol % with respect to all monomer units in the acid-modified PVdF, and the sealed body has a negative electrode water content of 400 ppm or less.

2. The nonaqueous electrolyte secondary battery of claim 1, wherein the nonaqueous electrolyte secondary battery is configured such that a change in a battery voltage is 0.01 V or less when the nonaqueous electrolyte secondary battery has a state of charge of 50% or more and is stored at 25° C. for 14 days or longer.

3. The nonaqueous electrolyte secondary battery of claim 1, wherein the titanium compound comprises at least one selected from the group consisting of a titanic acid compound, lithium titanate, and titanium dioxide.

4. The nonaqueous electrolyte secondary battery of claim 3, wherein the negative electrode active material comprises the titanic acid compound which is $H_2Ti_{12}O_{25}$.

5. The nonaqueous electrolyte secondary battery of claim 3, wherein the negative electrode active material comprises the lithium titanate which is spinel type $Li_4Ti_5O_{12}$.

6. The nonaqueous electrolyte secondary battery of claim 3, wherein the negative electrode active material comprises the titanium dioxide which has a bronze type structure.

7. The nonaqueous electrolyte secondary battery claim 1, wherein the positive electrode comprises a positive electrode active material comprising spinel-type lithium manganate.

8. The nonaqueous electrolyte secondary battery of claim 7, wherein the positive electrode active material comprises a layered rock salt type compound at a content of from 2 mass % to 5 mass % with respect to the positive electrode active material.

9. The nonaqueous electrolyte secondary battery of claim 8, wherein the layered rock salt type compound comprises at least one selected from the group consisting of lithium cobaltate, lithium nickel cobalt aluminate, and lithium nickel cobalt manganate.

10. The nonaqueous electrolyte secondary battery of claim 1, wherein the titanium compound comprises at least one selected from the group consisting of a titanic acid compound, lithium titanate, and titanium dioxide.

11. The nonaqueous electrolyte secondary battery of claim 2, wherein the titanium compound comprises at least one selected from the group consisting of a titanic acid compound, lithium titanate, and titanium dioxide.

12. The nonaqueous electrolyte secondary battery of claim 10, wherein the negative electrode active material comprises the titanic acid compound which is $H_2Ti_{12}O_{25}$.

13. The nonaqueous electrolyte secondary battery of claim 11, wherein the negative electrode active material comprises the titanic acid compound which is $H_2Ti_{12}O_{25}$.

14. The nonaqueous electrolyte secondary battery of claim 4, wherein the positive electrode comprises a positive electrode active material comprising spinel-type lithium manganate.

15. The nonaqueous electrolyte secondary battery of claim 5, wherein the positive electrode comprises a positive electrode active material comprising spinel-type lithium manganate.

16. The nonaqueous electrolyte secondary battery of claim 6, wherein the positive electrode comprises a positive electrode active material comprising spinel-type lithium manganate.

17. The nonaqueous electrolyte secondary battery of claim 12, wherein the positive electrode comprises a positive electrode active material comprising spinel-type lithium manganate.

18. The nonaqueous electrolyte secondary battery of claim 17, wherein the positive electrode active material comprises a layered rock salt type compound at a content of from 2 mass % to 5 mass % with respect to the positive electrode active material.

19. The nonaqueous electrolyte secondary battery of claim 18, wherein the layered rock salt type compound comprises at least one selected from the group consisting of lithium cobaltate, lithium nickel cobalt aluminate, and lithium nickel cobalt anganite.

20. The nonaqueous electrolyte secondary battery of claim 1, wherein the average particle diameter is from 4.0 to 20.0 μm.

* * * * *